Oct. 24, 1939.　　　J. N. MATTHEWS　　　2,176,915
CLAMPING MECHANISM
Filed April 7, 1937　　　4 Sheets-Sheet 1
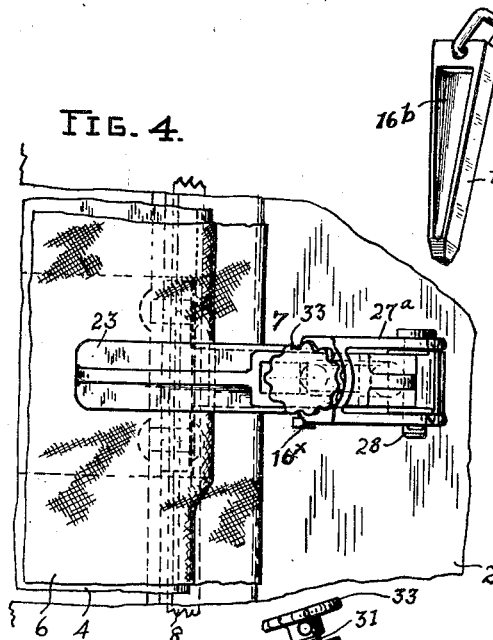
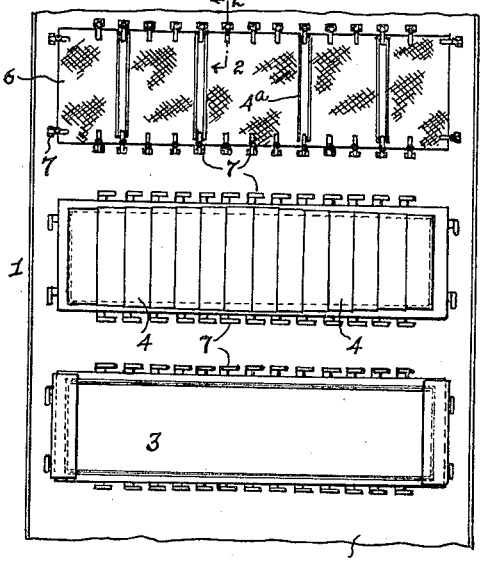
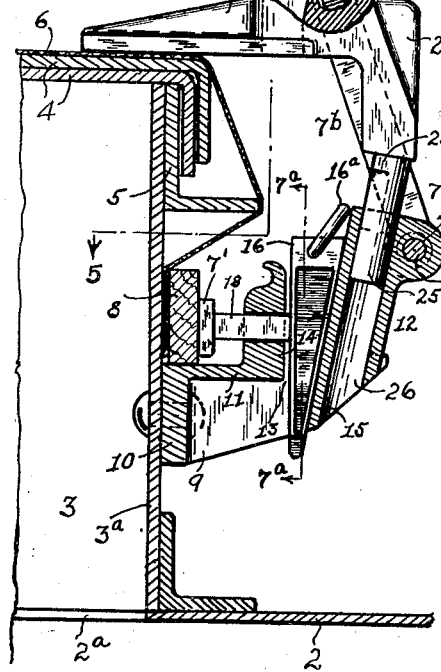
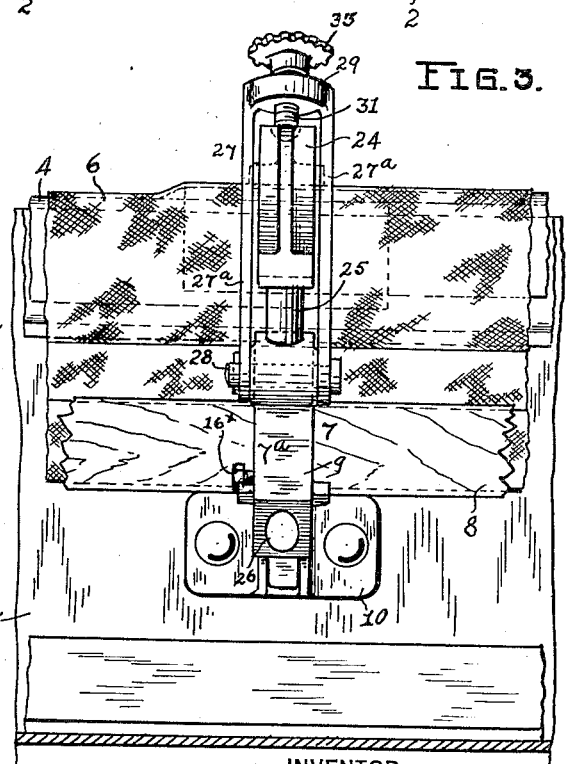
INVENTOR
JOSEPH N. MATTHEWS.
BY Geo. B. Pitts
ATTORNEY Oct. 24, 1939.   J. N. MATTHEWS   2,176,915
CLAMPING MECHANISM
Filed April 7, 1937   4 Sheets-Sheet 2
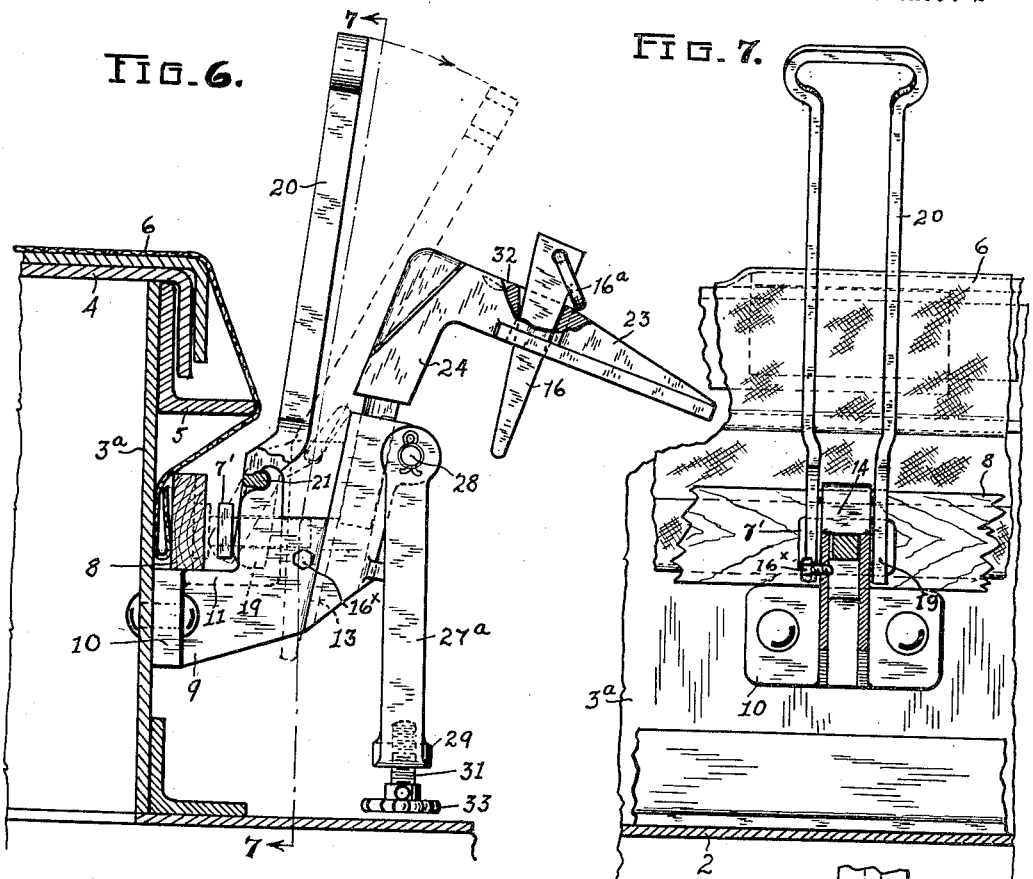
INVENTOR.
JOSEPH N. MATTHEWS
BY
ATTORNEY.

Oct. 24, 1939.    J. N. MATTHEWS    2,176,915
CLAMPING MECHANISM
Filed April 7, 1937    4 Sheets-Sheet 3
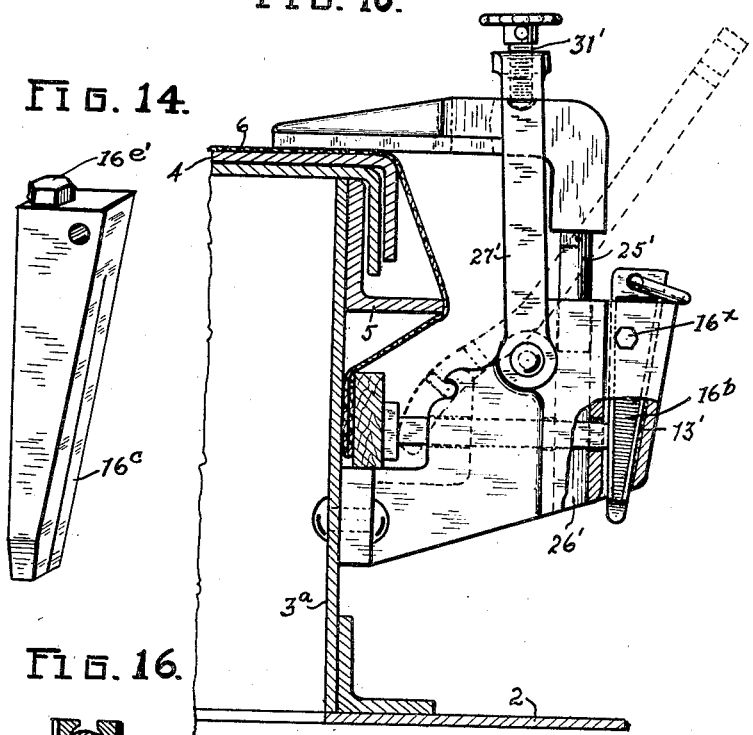
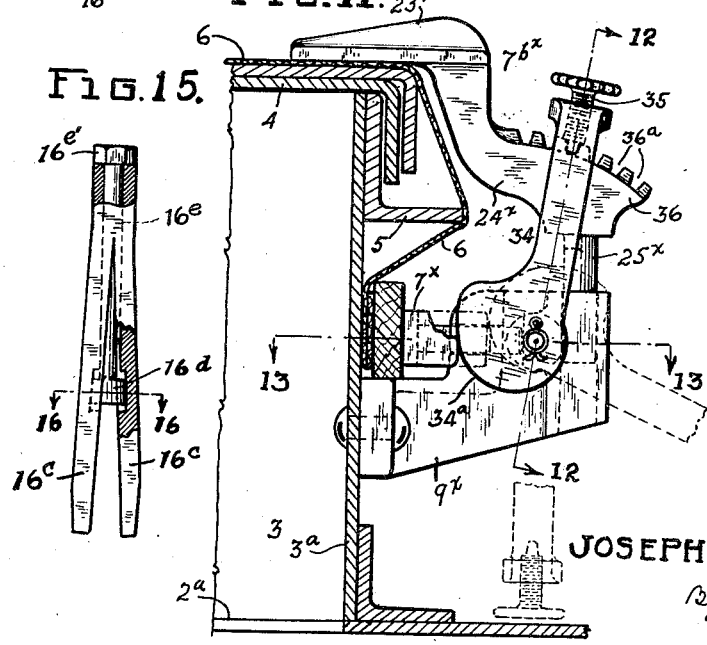
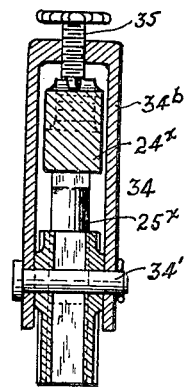
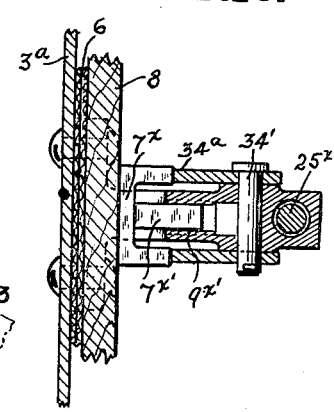
INVENTOR.
JOSEPH N. MATTHEWS.
By Geo. B. Pitts
ATTORNEY.

Oct. 24, 1939.  J. N. MATTHEWS  2,176,915
CLAMPING MECHANISM
Filed April 7, 1937     4 Sheets-Sheet 4
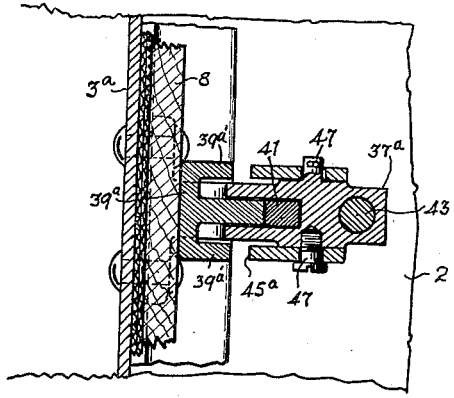
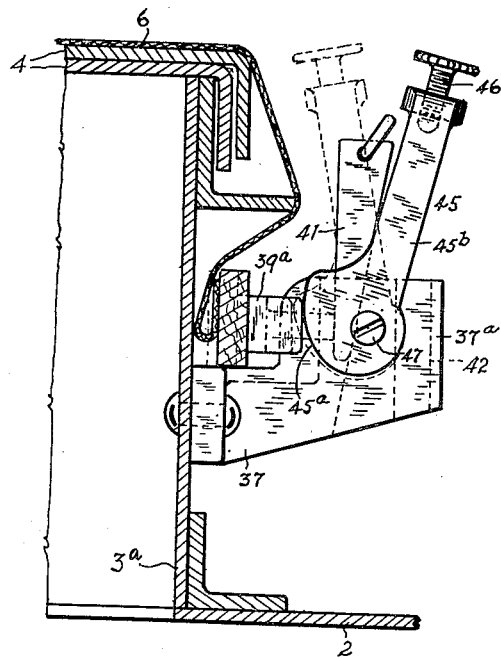
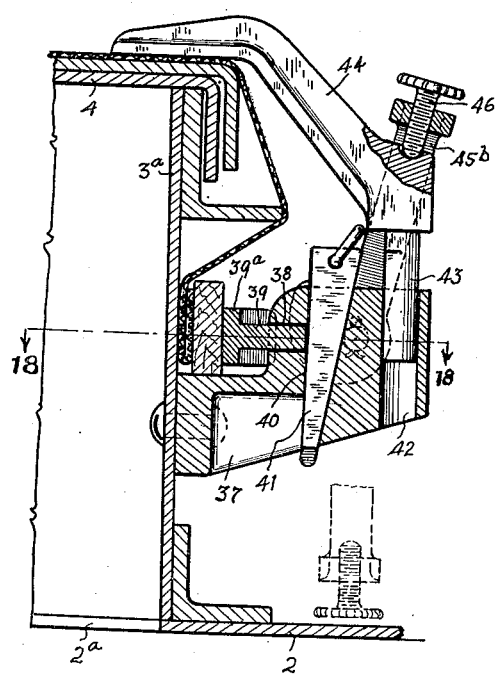
INVENTOR.
JOSEPH N. MATTHEWS.
BY
ATTORNEY.

Patented Oct. 24, 1939

2,176,915

UNITED STATES PATENT OFFICE 2,176,915

CLAMPING MECHANISM

Joseph N. Matthews, Lakewood, Ohio

Application April 7, 1937, Serial No. 135,525

12 Claims. (Cl. 292—256.5)

This invention relates to clamping devices for clamping tarpaulins when positioned over and around hatches and the covers therefor. The devices embodying my invention are particularly applicable for hatches on boats, for example ore boats and the like, where each hatch occupies a large area to accommodate material handling apparatus and accordingly the tarpaulin, on account of the size thereof required to cover and enclose the hatch, is readily loosened by winds unless securely clamped in position.

All tarpaulin clamping devices now in use on ships, of which I have knowledge, have been found to be unsatisfactory since sufficient clamping or securing effect could not be attained to meet the severe conditions to which the tarpaulins are subjected, the movable parts of the device, when not in use, could not be positioned to eliminate danger of injury to the ship's crew and other persons on board, and considerable time was required on a ship to operate the clamping devices to "batten" its hatches.

One object of this invention is to provide an improved device which enables a ship's crew to batten down easily and speedily its hatches, thereby saving the ship's owners time and money in allowing it to clear port without undue delay after a vessel is loaded or unloaded.

Another object is to give a seaman protection while working on deck by providing an improved clamping device which, when the tarpaulins have been removed, will be in an out of the way position, whereby danger of the seaman stumbling or falling is eliminated.

A further object is to provide an improved tarpaulin clamping and battening device which can easily be applied to vessels now in service.

Another object of the invention is to provide an improved clamping device having clamping elements arranged to engage spaced portion of a tarpaulin when enclosing a hatch and the covers therefor.

Another object of the invention is to provide improved devices for clamping and holding a tarpaulin in enclosing position over a hatch and the covers therefor, so constructed and mounted that each device may be readily operated into and out of clamping position.

Other objects of the invention will be apparent to those skilled in the art to which my invention relates from the following description taken in connection with the accompanying drawings, wherein Fig. 1 is a fragmentary plan view of a boat showing three hatches disposed transversely thereof.

Fig. 2 is a fragmentary section on the line 2—2 of Fig. 1, enlarged.

Fig. 3 is an elevational view.

Fig. 4 is a plan view of parts shown in Figs. 2 and 3.

Fig. 5 is a plan view showing the cover clamping device in its inoperative position.

Fig. 6 is a side view showing the operation of clamping the tarpaulin, parts being broken away.

Fig. 7 is a section on the line 7—7 of Fig. 6.

Fig. 7a is a fragmentary section on the line 7—7 of Fig. 6, but showing the wedge in position.

Fig. 8 is a fragmentary bottom view of the cover clamping device.

Fig. 9 is a fragmentary plan view of the supporting member.

Fig. 9a is a perspective view of the wedge.

Fig. 10 is a side elevation of a modified form of construction, parts being in section and broken away.

Fig. 11 is a side elevation showing a different embodiment of the invention.

Figs. 12 and 13 are sections on the lines 12—12 and 13—13, respectively, of Fig. 11.

Fig. 14 is a perspective view of a different form of wedge.

Fig. 15 is an elevation of the wedge shown in Fig. 14, parts being broken away.

Fig. 16 is a section on the line 16—16 of Fig. 15.

Fig. 17 is a view, partly in section, of another modified form of construction shown in position.

Fig. 18 is a section on the line 18—18 of Fig. 17.

Fig. 19 is a view of parts shown in Fig. 17 and illustrating the operation of clamping the tarpaulin.

In the drawings, 1 indicates as an entirety a portion of a boat of the ore carrying type, the deck 2 thereof having transversely disposed hatches 3; three hatches being shown. The hatches herein shown consist of openings 2a through the deck 2 and side walls 3a along the sides and ends of the opening, the side walls being preferably reinforced by an angle 5. Each hatch 3 is closed by two series of covers 4 extending from the center of the hatch outwardly to the ends thereof. When in closed position, the outer edge and depending flanges of the inner cover overlap the inner edge and depending flanges of the adjacent cover and the latter and succeeding covers (except the end one) are similarly related to the adjacent covers, respectively. To open the hatch the covers 4 of each series are slid into a superposed relation with respect to the outer or end cover and suitably supported on the deck.

6 indicates the tarpaulin which is stretched over the hatch covers 4 and angles 5, as shown in the upper portion of Fig. 1, with its marginal side and end portions clamped to or against the side walls 3a by a plurality of clamping mechanisms, each indicated as an entirety at 7. The mechanisms 7 are spaced along the side walls of the sides and ends of each hatch, their clamping elements 7' being arranged to engage and clamp a bar or batten 8, which is preferably formed of wood and extends substantially from end to end of each side wall. As will be understood from Figs. 1, 2 and 3, the adjacent marginal edge of the tarpaulin 6 is clamped between the bar 8 and side wall 3a, such edge being doubled on itself, as shown, when its size makes this doubling over necessary.

Each clamping mechanism 7 consists of a clomping device indicated as an entirety at 7a, for engaging the bar 8 and through its clamping the tarpaulin in position and a supplemental clamping device, indicated as an entirety at 7b, operable as later set forth to engage that portion of the tarpaulin which extends over the hatch covers. These devices are constructed in a manner whereby either device may be operated independently of the other or conjointly operated, and/or the supplemental clamping device removed.

Of this mechanism, 9 indicates as an entirety a supporting member which may be supported in operative relation to a hatch, that is, on the deck 2 or side wall 3a of the hatch. In the illustrated form of construction the number 9 is by preference, arranged to be mounted on the side wall of the hatch to eliminate obstructions on the deck; and this arrangement is advantageous as in my improved construction none of the parts of the mechanism engage the deck when the hatch covers and tarpaulin are removed. Accordingly, the member 9 is shaped to provide at its lower inner end flanges 10, which may be bolted or riveted to the adjacent side walls 3a, an outwardly extending wall 11 on which the bar 8 may rest while being clamped and an up-standing member 12, these parts being formed integrally. The member 12 is formed with an opening 13 through it, the inner wall 14 of the opening being disposed vertically and its rear wall 15 being inclined downwardly and inwardly so as to receive and accommodate a wedge 16, for a purpose later set forth. The wall 14 is formed with a horizontally disposed opening 17 to slidably receive a shank 18, which carries at its inner end a clamping element 7'. The outer end of the shank 18 extends into the opening 13 for engagement by the wedge 16. The clamping element 7' extends laterally to either side of the shank 18 to provide a wide clamping surface to engage the bar 8 and also walls arranged to be engaged by the bifurcated ends 19 of a suitable tool 20. The tool ends 19 are connected by a bar 21 which is adapted to removably engage a seat 22 provided on the upper end of the wall 14, the bar thereby serving as a fulcrum, so that when the tool is operated to the position shown in dotted lines in Fig. 6, the clamping element 7' will be operated into final position, that is, with the bar 8 clamped against the adjacent side wall 3a with the marginal edge of the tarpaulin secured to the latter wall, and while the element is held in this position by the tool 20, the wedge 16 may be dropped into the opening 13 behind and in engagement with the outer end of the shank 18 to hold the clamping element 7' in its operated position, as shown in Fig. 2. The wedge 16, when positioned, may be hit with a hammer or other device to frictionally secure it in position in the opening 13, that is, between and in engagement with the wall 15 and inner end of the shank 18; and as its lower end is accessible, the wedge may be loosened by a blow thereon. However, I prefer to lock the wedge 16 in position so that it cannot be loosened or knocked out by the washing of waves on and over the ship's deck. In one form of locking means I provide one lateral side of the wedge with a surface or wall 16b which is inclined inwardly and upwardly. I also form the adjacent side wall of the opening 13 with a threaded opening into and through which a screw 16x extends, so that after the wedge 16 is positioned, the screw 16x may be turned to cause its inner end to engage the wall 16b. It will be obvious that if the inclined wall 16b were omitted, the screw 16x could be tightened against the wedge and clamp it against the remote side wall of the opening and such clamping may be effected by tightening the screw against the wall 16b, but by inclining the wall as described, the screw end forms a lock to positively prevent upward movement of the wedge. The upper end of the wedge is provided with a bail 16a or other device to facilitate its removal and handling. In the form of locking means shown in Figs. 14, 15, 16, the lower portion of the wedge is formed of separable members 16c, which may be expanded against the side walls of the opening 13 by an expanding device or cam 16d between these members. The device is connected to a shaft 16e which extends through the upper portion of the wedge and is provided with a non-circular head 16e whereby upon the application of a suitable tool, the cam 16d may be rotated a quarter turn to expand the members 16c as shown. The wedge members 16c are resilient so that upon turning the cam 16d to its normal position they will assume a side by side relation to permit the positioning of the wedge in its opening or removal of the wedge therefrom.

The supplemental or separte device 7b comprises an arm 23 arranged to engage that portion of the tarpaulin extending over the adjacent hatch cover and a depending portion or leg 24 terminating in a rod 25, which removably and slidably fits a recess 26, of similar shape in cross section, formed in the up-standing member 12, outwardly of the opening 13. The rod 25 and the recess 26 therefor are preferably round so that the device may be swung to an inoperative position parallel to the side wall 3a when not in use (see Fig. 5). The rod 25 is movable endwise in the recess 26 and guided by the walls thereof when the device 7b is operated to clamp the tarpaulin, as well as when the device is being moved or rotated to its inoperative position, as later set forth.

The clamping device 7b is locked or secured to the supporting member 9 by means indicated as an entirety at 27, to effect a clamping engagement of the arm 23 with the tarpaulin. The securing means 27 comprise a pair of links 27a disposed upon opposite sides of the member 9 and pivoted on the ends of a pin or shaft 28a mounted in an opening 28' formed in the thickened portion of the wall 12, the links being connected at their free ends by a cross bar 29, preferably integrally therewith. The bar 29 is formed with a threaded opening 30 in which is mounted a screw 31, the free or inner end of which, when the screw is rotated, is adapted to be projected into a notch or recess 32 formed in the arm 23, and when tightened, the screw serves to rigidly connect the devices 7a, 7b, together and clamp the arm 23 against the tarpaulin 6, as shown in Figs. 2, 3 and 4.

The outer end of the screw 31 is provided with a suitable head or device 33, whereby it may be effectively operated to clamp the arm 23 against the tarpaulin, the slidable relation between the rod 25 and its recess 26 permitting movement of the arm 23 by the endwise movement of the screw. Upon disengagement of the securing means 27, the clamping device 7b may be removed or rotated into an inoperative position, for example, into a position wherein the arm 23 is parallel to the side wall 3a (see Fig. 5), when the hatch is to be opened, as shown in Fig. 1. For maintaining the device 7b in this position, the upper end of the recess 26 is formed with off-sets 26a (see Fig. 9) and the upper end of the rod 25 is provided with lugs 25a (see Fig. 8), complementary to the off-sets 26a, and arranged to seat therein to lock the device 7b in this predetermined position. When the clamping device 7b is disposed in its inoperative position, as just referred to, the securing links are swung into a position similar to that shown in Fig. 6. The arm 23 may be formed with an opening 23a to receive the wedge 16 when it is not in use or while the clamping element 7' is being operated by the tool 20.

It will be noted that when the tarpaulin is in position, the arm 23 engages therewith to clamp it against the hatch covers which rest upon the upper end of the adjacent side wall 3a. Also, since the clamping device 7b is adjustably related to the supporting member 9, its arm, instead of being clamped to the tarpaulin as shown in Fig. 2, may be clamped upon the end of a channel or cross bar 4a (see Fig. 1) and operate therethrough to secure the tarpaulin in position.

Fig. 10 illustrates a modified form of construction wherein the wedge receiving opening, indicated at 13' is arranged rearwardly of the recess, indicated at 26', which receives the supporting rod 25' for the supplemental clamping device. In this arrangement the recess 26' extends vertically and the links, indicated at 27' of the securing means, are pivotally mounted inwardly of the recess 26' so that the application of pressure or force by means of the screw, indicated at 31', is transmitted substantially axially of the recess 26' and at right angles to the covers 4.

Figs. 11, 12 and 13 illustrate a different embodiment of the invention.

In this form of construction, the supplemental clamping device 7bˣ comprises an arm 23x arranged to engage that portion of the tarpaulin extending over the hatch covers and a depending portion or leg 24x, which terminates in a rod 25x removably and slidably and rotatably mounted in the supporting member 9x similarly to rod 25 of the device 7b. I provide on the supporting member 9x a combined clamp operating and locking device 34 so arranged and mounted that it may operate and lock the clamping element, indicated at 7x, which secures the tarpaulin in position, and also clamp the supplemental clamping element in position against the adjacent portion of the tarpaulin extending over the hatch cover, or clamp either element in final position independently of the other element. The clamping element 7x is provided with a shank 7x' which is guided endwise in an opening 9x' in the member 9x. The device 34 is pivotally mounted on a pivot pin 34' carried by the supporting member 9x and comprises a cam 34a arranged to engage and operate the clamping element 7x and an arm 34b arranged to be interlocked to the supplemental clamping device to secure the cam 34a in operated position, the interlocking element 35 on the arm 34b being adjustable so as to operate the supplemental clamping device toward the adjacent hatch cover and effect a clamping engagement with the tarpaulin. In this form of construction, the leg 24x of the supplemental clamping device is shaped to provide an arcuate wall 36 concentric to the axis of the shaft 34' and this wall is provided with a plurality of recesses or notches 36a (which are formed between upstanding ribs or teeth on the wall) into one of which the interlocking element 35 projects to lock or secure the device 34 in operated position, that is, with its cam 34a securing the element 7x in clamping position (see Fig. 11).

By preference the device 34 consists of an inverted U-member pivoted to the opposite ends of the pin or shaft 34' on opposite sides of the member 9x and straddles the leg 24x of the supplemental clamping device, both legs of the U-member being preferably provided with cams 34a which engage side walls extending rearwardly from the ends of the clamping element 7x; also the interlocking element 35 consists of a screw extending through a threaded opening formed in the connecting wall for the U-member legs. The screw 35 is provided with a head so that it may be turned, the effect of which is to first project its inner or free end into one of the notches 36a to secure the device 34' in operated position and to finally clamp the supplemental device in engagement with the tarpaulin. When the tarpaulin is to be removed and the covers are moved to open position, the device 34 is swung into the position shown in dotted lines in Fig. 11 and the supplemental clamping device is moved to a position parallel with the adjacent side wall.

In operation, following the positioning of the covers 4, the tarpaulin 6 and the bar 8, and with the screw turned to position its inner end beyond the ribs on the wall 36, the device 34 is swung from its dotted line position counter-clockwise, as shown in Fig. 11, such operation serving through the engagement of the cam 34a with the clamping element 7x to move the latter toward the side wall and thus secure the marginal edge of the tarpaulin thereto. Upon movement of the device 34 to the limit of its movement to effect such clamping, the screw 35 is turned to project its free end into the adjacent notch 36a. The engagement of the screw 35 with the walls of the notch will lock the device against movement clockwise. If the turning of the screw is continued, its endwise movement will serve to move the supplemental clamping device toward the adjacent hatch cover and thus secure the tarpaulin to the latter.

Referring to Figs. 17, 18 and 19, which illustrate another embodiment of the invention, 37 indicates a supporting member suitably secured to the hatch side wall 3a and having an up-standing wall 37a, which is (*a*) formed with a guide way 38 to receive the shank 39 of a clamping element 39a, the latter in turn being arranged to operate through the batten 8 to clamp the tarpaulin 6 against the side wall 3a, (*b*) an opening 40 to receive a wedge 41 and (*c*) a recess 42 to removably and slidably and rotatably receive the supporting rod 43 of a supplemental clamping device 44. 45 indicates a device pivotally supported on the wall 37a for operating the clamping element 39a into clamping position, whereby the wedge 41 may be positioned in the opening 40 in engagement with the outer end of the shank 39 as shown in Fig. 17, thereby securing the clamping element 39a in operated position. The operating device 45 comprises a cam 45a and an arm 45b which may be grasped by an operative (for example, a deckhand) and swung to the dotted line position as shown in Fig. 19, which operation will cause the cam to engage the lateral, rearwardly extending side walls 39a' of the clamping element 39a and move the latter into clamping position, following which a wedge 41 is inserted in the opening 40. After the wedge 41 is positioned to lock the clamping element 39a in position, as above set forth (see Fig. 17), the operating device 45 may be swung clockwise (as view in Fig. 19) to an inoperative position, as shown in full lines in this view. Thereafter, the clamping device 44 is positioned on the supporting member 37; that is, its rod 43 is inserted in the recess 42 with the outer end of the device 44 disposed above that portion of the tarpaulin extending over the hatch covers 4; the device 45 is then swung back to a mid position so that the screw 46 may engage the device 44, and when tightened, as shown in Fig. 17, secure the device in clamped engagement with the tarpaulin.

The device 45 is substantially U shaped the side members or legs of the device being pivoted on stud shafts 47 extending from the opposite sides of the wall 37a. As shown, one shaft 47 is threaded into an opening formed in the wall 37a to permit assembly of the device 45. In this form of construction, two cams 45a are provided to engage with the opposite ends of the clamping element 39a to operate it, the device straddles the outer end of the clamping device 44 and the screw 46 is mounted in and extends through a threaded opening formed in that portion of the device which connects the legs together, so that the applied force resulting from the tightening of the screw 46, to rigidly secure the clamping device 44 in position, is in a plane between the legs of the U-device.

The clamping device 44 may be removed at will without affecting the clamping of the tarpaulin by the batten; or it may be released from its operated position and swung about the axis of the recess 42 to an inoperative position, that is, in a position substantially parallel to the adjacent hatch side wall 3a. For this latter purpose, the rod 43 is provided with an interlock 43a which fits an off-set in the recess 42 (not shown), to prevent the device, when moved to its inoperative position, from swinging outwardly and becoming a hazard. The device 44 is released by loosening the screw 46 and swinging the device 45 to the position shown in dotted lines in Fig. 17. To unclamp the tarpaulin a sharp blow may be imparted to the lower end of the wedge. This operation will be facilitated if the device 45 is operated and the cams 45a brought into engagement with the opposite ends of the clamping element 39a and the latter held thereby while the wedge is removed.

It will be apparent that the wedge 41 may be locked in the opening 40 by means similar to that already set forth in connection with the construction shown in Figs. 1 to 7, inclusive.

In each of my forms of mechanisms either clamping element may be operated independently of the other element. It will be noted that I provide an arrangement wherein the clamping elements operate in directions at right angles to each other.

To those skilled in the art to which my invention relates many changes in construction and widely differing embodiments and applications of the invention will suggest themselves without departing from the spirit and scope thereof. My disclosures and the description herein are purely illustrative and not intended to be in any sense limiting.

What I claim is:

1. In a device of the class described, the combination of a supporting member adapted to be secured in operative relation to the side wall of a hatch and provided with an up-standing wall formed with an opening extending substantially parallel to the hatch side wall and a guide way substantially perpendicularly to the side wall, a clamping element having a shank slidably supported in said guide way and arranged to engage the marginal edge of a tarpaulin, and a wedge arranged to removably seat in said opening and engage the outer end of said shank to hold said clamping element in clamp operated position.

2. In a device of the class described, the combination of a supporting member adapted to be secured in operative relation to the side wall of a hatch and provided with an up-standing wall formed with an opening extending substantially parallel to the hatch side wall and a guide way extending substantially perpendicularly to the side wall, a clamping element having an outwardly extending shank slidably supported in said guide way, and a wedge arranged to removably seat in said opening and engage the outer end of said shank to hold said clamping element in clamp operated position, said clamping element extending laterally to either side of said supporting member.

3. In a device of the class described, the combination of a supporting member adapted to be secured in operative relation to the side wall of a hatch, an element slidably mounted on said member and arranged to removably clamp the marginal edge of a tarpaulin against the side wall when the tarpaulin is positioned over the hatch, a clamping device mounted on said member to move in a direction substantially parallel to said side wall, means for operating said clamping element into clamping position, and a device for securing said element in clamping position, one element of said operating means being arranged to engage said clamping device and clamp it against that portion of the tarpaulin extending over the hatch cover.

4. In a device of the class described, the combination of a supporting member adapted to be secured in operative relation to the side wall of a hatch, an element slidably mounted on said member and arranged to removably clamp the marginal edge of a tarpaulin against the side wall when the tarpaulin is positioned over the hatch, a clamping device mounted on said member to move in a direction substantially parallel to said side wall, and a link pivoted on said member and provided with a cam for operating said clamping element and an adjustable element for moving said device into clamping engagement with the tarpaulin extending over the cover of the hatch, said adjustable element being arranged to lock said link in operated position.

5. In a device of the class described, the combination of a supporting member adapted to be secured to the side wall of a hatch and formed with an opening extending substantially parallel to the hatch side wall and a guide way substantially perpendicularly to the side wall and merging at its rear end into said opening, a clamping element having a shank slidably supported in said guide way and arranged to project into said opening, and a wedge arranged to removably seat in said opening and engage the outer end of said shank to hold said clamping element in clamp operated position, that wall of said wedge which engages the shank being disposed perpendicularly to the direction of movement of said shank.

6. In a device of the class described, the combination of a supporting member adapted to be secured in operative relation to the side wall of a hatch and formed with a guide way extending outwardly perpendicularly to the hatch side wall and a substantially vertical opening extending above and below said guide way and merging therewith, a clamping element having a shank slidably and non-rotatably supported in said guide way and arranged to extend into said opening, said clamping element having portions extending laterally to either side of said supporting member, a wedge arranged to removably seat in said opening and engage the outer end of said shank to hold said clamping element in operated position, and means for locking said wedge in shank engaging position.

7. In a device of the class described, the combination of a supporting member adapted to be secured in operative relation to the side wall of a hatch and formed with a substantially vertical opening and a guide way, a clamping element having a shank slidably supported in said guide way, a wedge arranged to removably seat in said opening and engage the outer end of said shank to hold said clamping element in operated position, one side of said wedge being provided with an inclined surface, and a screw on said member arranged to engage said inclined surface for locking said wedge in shank engaging position.

8. In a device of the class described, the combination of a supporting member adapted to be secured in operative relation to the side wall of a hatch and formed with a substantially vertical opening and a guide way, a clamping element having a shank slidably supported in said guide way, a wedge arranged to removably seat in said opening and engage the outer end of said shank to hold said clamping element in operated position, the lower end of said wedge consisting of laterally expandible portions, and means for expanding said portions against the walls of said opening for locking said wedge in shank engaging position.

9. In mechanism of the class described, the combination of a supporting member adapted to be secured in operative relation to a hatch, an element movably mounted on said member for clamping the edge of a tarpaulin, a device pivoted on said supporting member and arranged to engage said element for moving it into clamping position, and a wedge arranged to be seated in said member in engagement with said element to hold it in operated position.

10. In mechanism of the class described, the combination of a supporting member adapted to be secured in operative relation to a hatch, an element movably mounted on said member for clamping the edge of a tarpaulin, a device movably mounted on said member for clamping that portion of the tarpaulin extending over the hatch cover, means for operating said element into clamping position, said means including an element pivoted on said supporting member and arranged to engage said clamping device to clamp the latter against the tarpaulin, and means for securing said clamping element in operated position.

11. In mechanism for securing a tarpaulin in position over a hatch, the combination of a supporting member adapted to be secured in operative relation to the hatch, clamping elements slidably mounted on said member one slidable horizontally to clamp the marginal portion of the tarpaulin and the other substantially vertically to clamp the tarpaulin against the hatch cover, a device pivoted on said member arranged to move one of said elements into clamping position, and a movable device carried by said pivoted device and arranged when operated to detachably engage said other element, to thereby secure said pivoted device in operated position and said other element in clamping position.

12. In a device of the class described, the combination of a support adapted to be secured to the side wall of a hatch, a pair of clamping devices slidably mounted on said member, one to move perpendicularly to the hatch side wall to clamp the marginal edge of the tarpaulin thereagainst and the other to move in a direction substantially parallel to the side wall of the hatch to clamp the tarpaulin to the hatch cover, a removable member for securing one of said devices in clamping position, a separate member swingably mounted on said support and provided with a wall arranged to operate said last mentioned device into clamping position and an adjustable element for engaging with and operating the other device for securing it in clamping position.

JOSEPH N. MATTHEWS.